3,043,799
POLYESTERS DERIVED FROM DIMETHYL-
MALONIC ACID AND DIPHENOLS
Roger Paul Joseph Gaston Thiebaut and Yves Pierre
Marie Etienne, Vincennes, France, assignors to Eastman Kodak Company, Rochester, N.Y., a corporation of New Jersey
No Drawing. Filed Jan. 3, 1961, Ser. No. 80,011
8 Claims. (Cl. 260—47)

This application relates to linear polyesters wherein a substantial proportion of the constituents are dimethyl malonic acid and a diphenol such as bisphenol A. A part of the dimethyl malonic acid may be replaced with other dibasic carboxylic acids to obtain modified polyesters. A part of the diphenol may be resorcinol or hydroquinone. These various polyesters are useful in the preparation of fibers, film and other shaped objects and include such special utility as for preparing photographic film support.

It is an object of this invention to provide new and useful film and fiber-forming polyesters having unusually excellent attributes with particular regard to chemical and physical stability such as improved hydrolytic stability toward aqueous acids and bases. It is, therefore, included among the objects of this invention to provide improved film base for special photographic purposes wherein the base has unusually stable properties with respect to various chemical treatments such as used during photographic film processing operations.

Other objects will become apparent elsewhere herein.

Although polyesters have been described in the prior art which are derived from dimethyl malonic acid no one has recognized the unusual attributes of using diphenols in lieu of the glycols. Even though the use of diphenols or bisphenols has recently become better known in the art concerning the preparation of polyesters from a variety of acids, it is generally considered more advantageous to employ glycols instead of the diphenols or bisphenols in the preparation of polyesters useful for fibers and film such as would have value as a photographic support for light sensitive silver halide emulsions. It was therefore quite unexpected to discover that the polyesters of this invention have an unusually advantageous combination of properties which render the polyesters especially meritorius for the preparation of fibers and films where especially good chemical and physical stability is required without any need for the addition of stabilizers or other additives in most instances. Thus, this invention provides a new, useful and unobvious contribution to the art.

According to a particular embodiment of this invention there is provided a linear highly polymeric fiber-forming polyester of (A) a dibasic carboxylic acid consisting of (1) from 60 to 100 mole percent of dimethylmalonic acid, (2) from 0 to 20 mole percent of a member selected from the group consisting of aliphatic dibasic acids having from 2 to 10 carbon atoms, and (3) from 0 to 40 mole percent of a member selected from the group consisting of carbonic acid, terephthalic acid, isophthalic acid, 4,4'-sulfonyldibenzoic acid, 4,4'-dibenzoic acid, 4,4'-oxydibenzoic acid and 4,4'-alkylenedibenzoic acids wherein the alkylene radicals contain from 1 to 4 carbon atoms, there being no more than two different members selected from the combination of all of the groups of acids (1), (2) and (3), and (B) a dihydroxy compound consisting of from 60 to 100 mole percent of a 4,4'-alkylenediphenol wherein the alkylene radicals contain from 1 to 6 carbon atoms and from 0 to 40 mole percent of a dihydroxybenzene selected from the group consisting of resorcinol, hydroquinone and toluhydroquinone, said polyester melting at between 200° and 350° C. having an inherent viscosity of at least 0.4 and having improved hydrolytic stability toward aqueous acids and bases due to the dimethylmalonic constituent in the polyester. Inherent viscosities are measured in methylene chloride or other solvent such as tetrachloroethane-phenol (60:40).

These polyesters can be prepared by various techniques well known in the art and it is not believed necessary to burden the present specification with a detailed description of the details of these various processes; moreover, this will be adequately illustrated by the examples below. Thus, one can react a diphenol with a dimethylmalonic acid chloride in the presence of an organic or inorganic base. Another technique is to use an ester or an amine or ammonium salt of dimethylmalonic acid and carry out the reaction with the diphenol so as to displace a volatile compound (alcohol, monophenol, amine or ammonia). The esters of dimethylmalonic acid or other acids which are used can be aliphatic or aromatic esters. In some cases it is advantageous to carry out the reaction at least in the beginning stages in the presence of a solvent although this is usually not particularly desirable. When the ester interchange technique is being employed it is advantageous to carry out the reaction using any of the usual catalysts employed in polyesterification reactions which are well known in the art such as titanium alkoxides, magnesium iodide, sodium ethylate, lithium hydride, and a great number of other metal-containing catalysts which in many cases have basic properties. Reference is made to such patents in the prior art as Belgium Patent 546,-376, U.S. 2,595,343, British 621,102, etc. which illustrate various process techniques.

Although the preferred dihydroxy compounds have been defined above which are ordinarily referred to as diphenols (also as bisphenols) and which may include resorcinol or hydroquinone as modifiers in lieu of a part of the diphenol, the diphenols can be more broadly defined as compounds having formulas as follows:

(I) 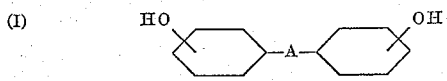

The hydroxyl groups are preferably located in positions meta or para to the A substituent.

(II) 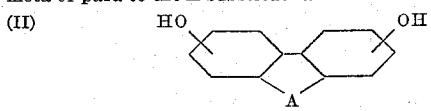

The hydroxyl groups are preferably located in a position either para to the A substituent or para to the chemical bond between the two benzene rings.

In the above formulas A represents a member selected from the group consisting of oxygen atoms, a carbonyl radical, a sulfonyl radical, various alkylene radicals containing from 1 to 6 or more carbon atoms, etc.

A great variety of such bisphenols are described by Schnell in Angew. Chemie 68 (1956), page 633, et seq.

This invention can be further illustrated by the following examples of preferred embodiments although it will be understood that these examples are included merely for purposes of illustration and are not intended to limit the scope of the invention unless otherwise specifically indicated:

The following reactants were placed in a suitable reaction vessel equipped with a stirrer and means for maintaining an inert atmosphere of dry nitrogen together with means for measuring temperature and reducing the pressure:

31.2 gm. (0.11 mole) of the phenyl diester of dimethylmalonic acid
22.8 gm. (0.10 mole) of 4,4'-isopropylidene diphenol (bisphenol A)
0.1 gm. of lithium hydroxide The apparatus was purged of air and heated on a metal bath to 140° C. under 30 mm. of mercury. Phenol began to distill rapidly. After two hours the temperature had reached 170° C. The temperature was increased in order to maintain the contents of the reaction vessel in the molten condition and the pressure was reduced to 0.5 mm. of mercury. The temperature reached about 310° C. The polyester was then cooled to form a transparent slightly colored product showing crystallinity when examined by X-ray diffraction. The melting point was about 258° C. and fibers can be melt spun from the melt. Fibers can also be spun from a solution of the polyester.

The following table gives further examples of this invention wherein copolymers were prepared as described above wherein a part of the bisphenol A is replaced with resorcinol as shown in the table.

| Mole percent of resorcinol: | Melting point, ° C. |
|---|---|
| 0 | 258 |
| 10 | 253 |
| 20 | 230 |
| 50 | 205 |
| 100 | 75 |

The polymers derived from 50% and 100% resorcinol do not represent embodiments of this invention but are included in the table for purposes of comparison.

These particular co-polyesters having from 10 to 20 mole percent of resorcinol or hydroquinone in their structure possess unusually excellent stability and have a softening temperature range and other attributes desirable for advantageous processing.

The following table will serve to further illustrate another modification of the invention using the same process of preparation described above for preparing the following polymers of bisphenol A replacing part of the dimethylmalonic acid with the indicated mole percent of carbonic acid. The process employed used the diphenyl ester of carbonic acid.

| Mole percent of carbonic acid: | Melting point, ° C. |
|---|---|
| 0 | 258 |
| 10 | 280 |
| 50 | 240 |

The polymers derived from 50% carbonic acid do not represent an embodiment of the invention but are included for purposes of comparison. It is quite surprising that 5–20 mole percent of carbonic acid actually raises the melting point. Moreover, these copolyesters have other excellent properties as already noted above.

Other modified polyesters can be prepared in accordance with the broader aspects of the invention as described above.

Although the invention has been described in considerable detail with reference to certain preferred embodiments thereof, it will be understood that variations and modifications can be effected without departing from the spirit and scope of the invention as described hereinabove and as defined in the appended claims.

We claim:
1. A linear highly polymeric fiber-forming polyester of (A) a dibasic carboxylic acid consisting of (1) from 60 to 100 mole percent of dimethylmalonic acid, (2) from 0 to 20 mole percent of a member selected from the group consisting of saturated aliphatic dibasic acids having from 2 to 10 carbon atoms, and (3) from 0 to 40 mole percent of a member selected from the group consisting of carbonic acid, terephthalic acid, isophthalic acid, 4,4'-sulfonyldibenzoic acid, 4,4'-dibenzoic acid, 4,4'-oxydibenzoic acid and 4,4'-alkylenedibenzoic acids wherein the alkylene radicals contain from 1 to 4 carbon atoms, there being no more than two different members selected from the combination of all of the groups of acids (1), (2) and (3), and (B) a dihydroxy compound consisting of from 60 to 100 mole percent of a 4,4'-alkylenediphenol wherein the alkylene radicals contain from 1 to 6 carbon atoms and from 0 to 40 mole percent of a dihydroxybenzene selected from the group consisting of resorcinol, hydroquinone, and toluhydroquinone, said polyester melting at between 200° and 350° C., having an inherent viscosity of at least 0.4 and having improved hydrolytic stability toward aqueous acids and bases due to the dimethylmalonic constituent in the polyester.

2. A polyester as defined by claim 1 wherein said dihydroxy compound (B) includes from 10 to 40 mole percent of one of said dihydroxybenzenes.

3. A polyester as defined by claim 2 of dimethylmalonic acid, 4,4'-isopropylidene diphenol and resorcinol.

4. A polyester as defined by claim 2 of dimethylmalonic acid, 4,4'-isopropylidene diphenol, resorcinol and hydroquinone.

5. A polyester as defined by claim 1 wherein said acid (A) (2) is from 5 to 20 mole percent of carbonic acid.

6. A polyester as defined by claim 5 of dimethylmalonic acid, carbonic acid and 4,4'-isopropylidene diphenol.

7. A fiber of a polyester as defined by claim 1.
8. A film of a polyester as defined by claim 1.

References Cited in the file of this patent
UNITED STATES PATENTS

| 2,720,502 | Caldwell | Oct. 11, 1955 |
| 2,961,427 | Walter | Nov. 22, 1960 |